US008818563B2

(12) United States Patent
Gwerder et al.

(10) Patent No.: US 8,818,563 B2
(45) Date of Patent: Aug. 26, 2014

(54) SYSTEM FOR CONTROLLING ROOM TEMPERATURE IN A BUILDING USING A FREE ENERGY SOURCE, AN ADDITIONAL ENERGY SOURCE, AND PREDICTIVE CONTROL

(75) Inventors: Markus Gwerder, Steinhausen (CH); Jürg Tödtli, Zürich (CH)

(73) Assignee: Siemens Aktiengesellschaft, Munich (DE)

( * ) Notice: Subject to any disclaimer, the term of this patent is extended or adjusted under 35 U.S.C. 154(b) by 783 days.

(21) Appl. No.: 12/083,543

(22) PCT Filed: Sep. 18, 2006

(86) PCT No.: PCT/EP2006/066445
§ 371 (c)(1),
(2), (4) Date: Apr. 14, 2008

(87) PCT Pub. No.: WO2007/042371
PCT Pub. Date: Apr. 19, 2007

(65) Prior Publication Data
US 2009/0112369 A1   Apr. 30, 2009

Related U.S. Application Data

(60) Provisional application No. 60/726,133, filed on Oct. 14, 2005.

(51) Int. Cl.
*G05B 15/00* (2006.01)
*F24F 7/00* (2006.01)
(52) U.S. Cl.
CPC .. *G05B 15/00* (2013.01); *F24F 7/00* (2013.01)
USPC ............. 700/277; 700/275; 700/276; 700/31; 700/36; 237/8 R; 236/78 D; 236/49.3

(58) Field of Classification Search
CPC ....................................................... G05B 15/00
USPC ............. 700/276, 277, 275, 31, 36; 237/8 R; 236/8 D, 49.3
See application file for complete search history.

(56) References Cited

U.S. PATENT DOCUMENTS 4,231,352 A   11/1980 Bowden et al.
4,897,798 A   1/1990 Cler
(Continued)

FOREIGN PATENT DOCUMENTS

WO   2004/025189 A1   3/2004

OTHER PUBLICATIONS

Athientis, A. K. and Tzempelikos, A. "A Methodology for Simulation of Daylight Room Illuminance Distribution and Light Dimming for a Room With a Controlled Shading Device", Jan. 2002, Elsevier, Solar Energy vol. 72, No. 4, pp. 271-281.*

(Continued)

*Primary Examiner* — Tejal Gami
(74) *Attorney, Agent, or Firm* — Staas & Halsey LLP

(57) ABSTRACT

In a building which has at least two floors, an apparatus for controlling and regulating room temperature having a hierarchical structure includes a predictive device on the top level, that provides optimal control of the use of at least one free energy source, and at least one device on a lower level which is used for feedback regulation of at least one additional energy source. The predictive device uses a building model and repeatedly optimizes the energy requirement or the energy costs. The regulation strategy of the predictive device uses characteristics of a passive heat accumulator of the building.

12 Claims, 3 Drawing Sheets

(56) References Cited

U.S. PATENT DOCUMENTS

| | | | | |
|---|---|---|---|---|
| 5,181,387 | A * | 1/1993 | Meckler | 62/59 |
| 6,098,893 | A * | 8/2000 | Berglund et al. | 236/51 |
| 6,439,469 | B1 * | 8/2002 | Gruber et al. | 237/8 R |
| 6,522,954 | B1 * | 2/2003 | Kummerer et al. | 700/278 |
| 7,147,168 | B1 * | 12/2006 | Bagwell et al. | 236/49.3 |
| 2002/0109011 | A1 | 8/2002 | Fleckenstein | |
| 2004/0182943 | A1 | 9/2004 | Hull | |

OTHER PUBLICATIONS

Pargfrieder, J. and Jörgl, H. P., "An integrate control system for optimizing the energy consumption and user comfort in buildings", Sep. 2002, IEEE International Symposium on Computer Aided Control System Design Proceedings.*

International Search Report for Application No. PCT/EP2006/066445; mailed Jan. 19, 2007.

* cited by examiner

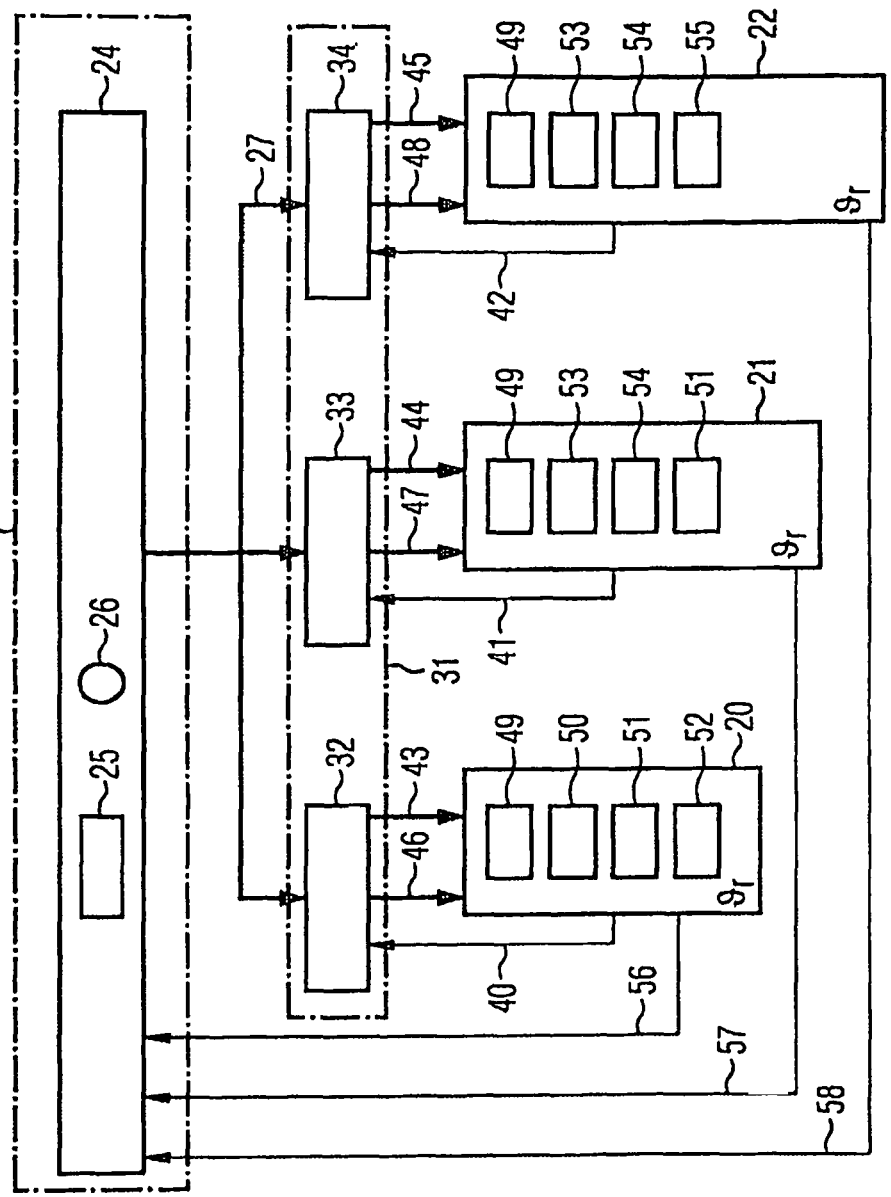

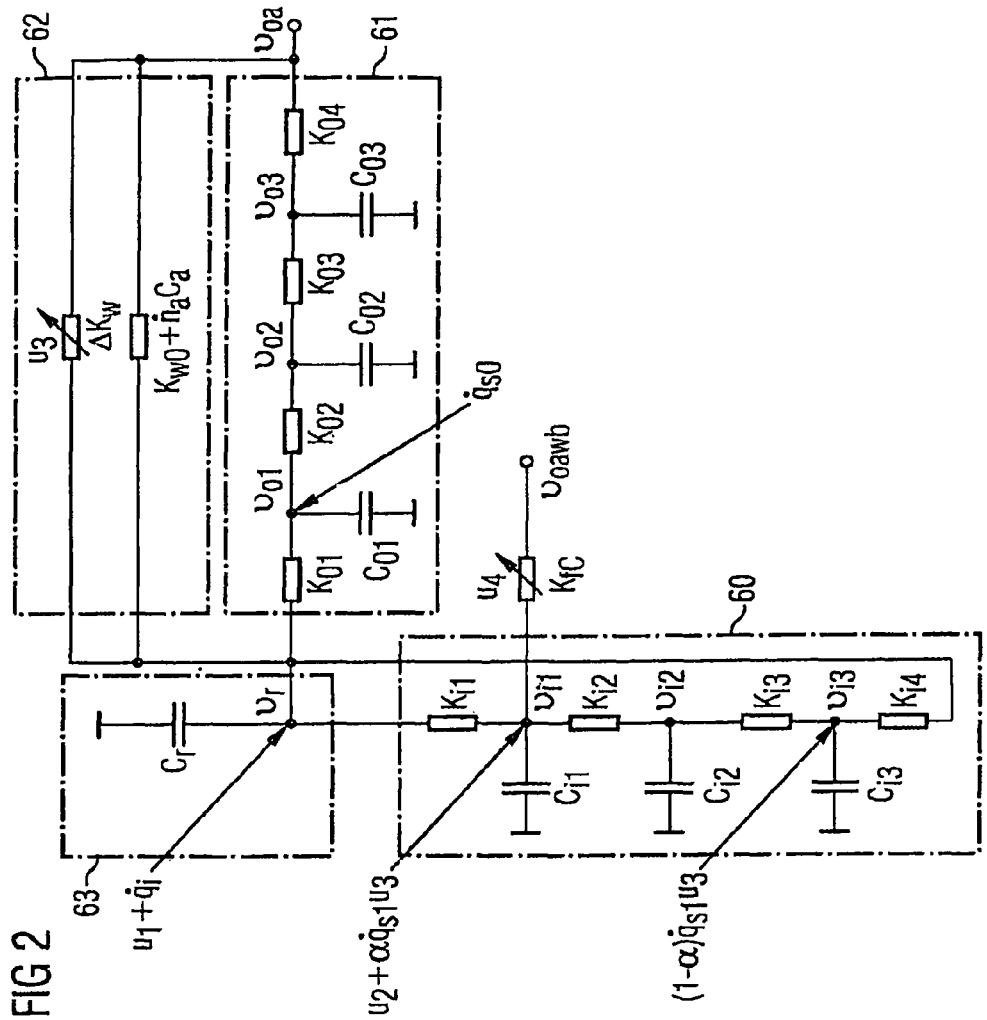

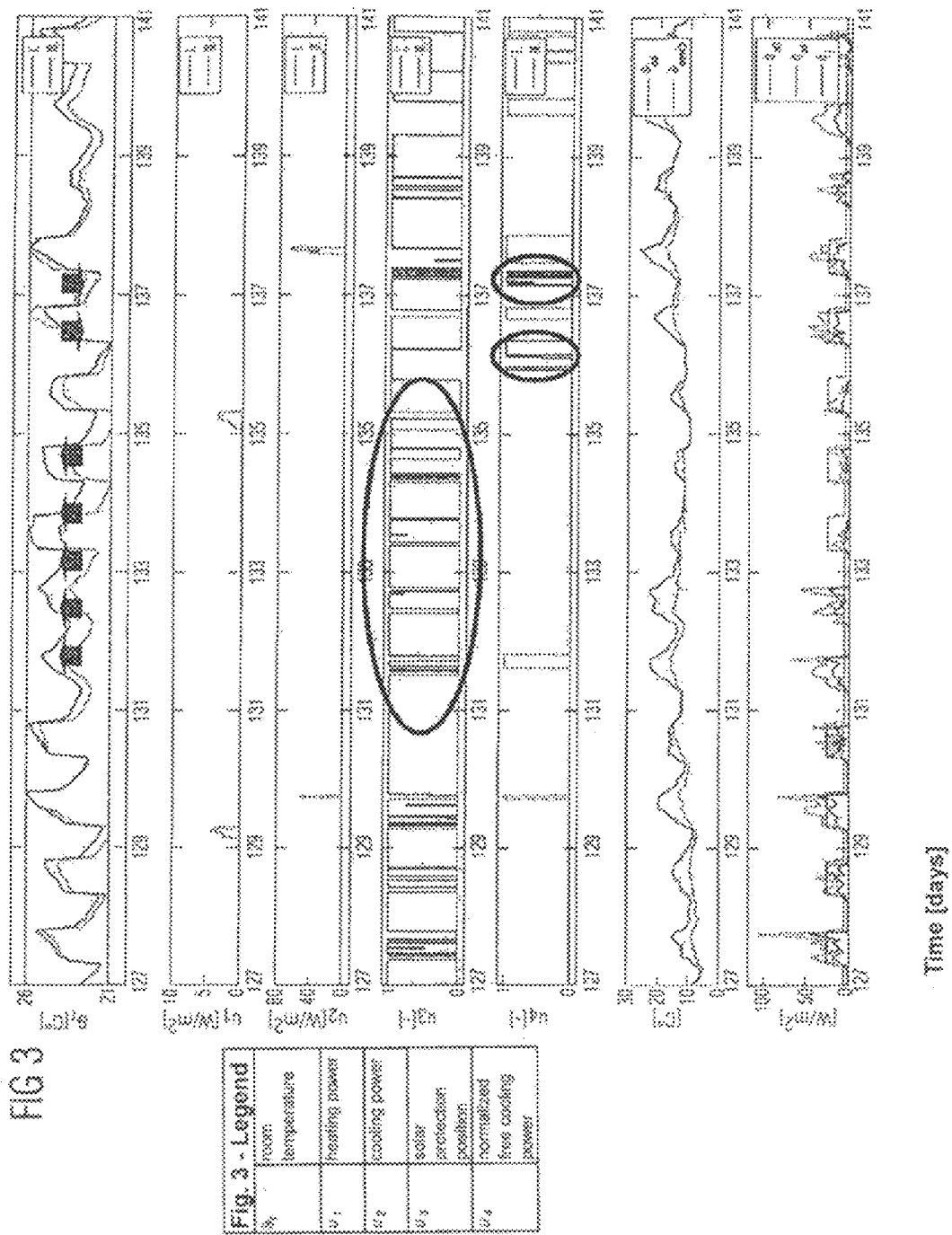

SYSTEM FOR CONTROLLING ROOM TEMPERATURE IN A BUILDING USING A FREE ENERGY SOURCE, AN ADDITIONAL ENERGY SOURCE, AND PREDICTIVE CONTROL

CROSS REFERENCE TO RELATED APPLICATIONS

This application is based on and hereby claims priority to U.S. Application No. 60/726,133 filed on Oct. 14, 2005 and PCT Application No. PCT/EP2006/066445 filed on Sep. 18, 2006, the contents of which are hereby incorporated by reference.

BACKGROUND OF THE INVENTION

Described below is a system for controlling and regulating a room temperature in a building. Such systems are suitable, for example, for heating and cooling rooms or room zones in buildings and are, for example, part of a building automation system.

Regulating systems by which it is possible to regulate a room temperature to a prescribed desired value are generally known. Known regulating systems include, for example, a so called PID controller, and heating water or cooling water circuits.

It is proposed in WO 94/27202 for the purpose of minimizing the energy costs to control an electric heating system on the basis of received information relating to tariffs and weather forecasts. EP1 074 900A discloses a predictive device for regulating or controlling supply variables.

SUMMARY

An aspect is a system by which a selectable degree of comfort can be achieved, and by which optimum use can be made of cost effective heating and cooling energy such that energy costs can be reduced.

BRIEF DESCRIPTION OF THE DRAWINGS

These and other objects and advantages of the present invention will become more apparent and more readily appreciated from the following description of exemplary embodiments, taken in conjunction with the accompanying drawings of which:

FIG. 1 is a block diagram of a system for controlling and regulating a room temperature in a building, FIG. 2 is a diagram of a room model that can be used by the system, FIG. 3 are graphs used for comparing regulating strategies.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

A building considered here by way of example is thermally conditioned primarily by cold and hot water, that is to say via cooling ceilings for cooling and via heaters for heating. The cold water for cooling can be reduced either by operating a cooling unit—and thus with high costs—or via free cooling by operating only a wet cooling tower—and thus with low energy costs. The hot water for heating is produced by operating a water heater—and thus with high energy costs. Moreover, solar protection apparatuses can be used to, regulate the degree of thermal comfort in the building, something which causes low energy costs. The room temperature can fluctuate within the comfort range for the room temperature, for example in the range of 21° C. to 26° C.

In a system with—as in the example considered here—passive heat accumulators, a defined, non vanishing comfort range is a fundamental precondition for the system to be at all able to profit from predictive regulation. The larger the comfort range is designed, the more the predictive regulation can be efficient in terms of energy and cost, since there is then also a relatively large range in which the thermal capacity of the building can be used. When, for example, a comfort range with a width of 5 K is given for the temperature, the maximum thermal difference that is stored in a typical concrete ceiling is already more than 1 kWh/m$^2$. Apart from the thermal capacity of the ceiling, further capacities of the building body are active in buildings such as, for example, thermal capacities of the interior and exterior walls and of the furniture.

When cost intensive heating and cooling systems are quick and well dimensioned, that is to say when the room temperature can be regulated within the comfort region without substantial time delay, there is no sort of risk that the demands of comfort could not be fulfilled. Erroneous forecasts on the basis of model errors or wrongly estimated disturbances therefore—temporarily—lead to increased demands on energy and/or costs, but not to a loss in comfort. For this reason, this type of predictive regulation is particularly suitable for application—including prototypical application—in real buildings, since here there is no need for the user of the building to lower his sights with regard to comfort.

In known regulating strategies for integrated room automation, solar protection regulation is independent of the regulation of heating, ventilation and air conditioning. So called integrated room automation deals with heating, ventilation, cooling, lighting and solar protection in rooms or room zones. More sophisticated solar protection regulating devices also considered, for example, the task of regulating artificial lighting, by way of example certain regulating devices take additional decisions depending on the current heating or cooling loads. The regulating concept has a hierarchical structure with typically one regulator on the uppermost level and typically a number of regulators on lower levels. The regulation on the uppermost level is performed via a model predictive regulation, free or cost effective energy sources such as, for example, solar energy gains via solar protection or free cooling via dry or wet cooling power being regulated on the uppermost level. The regulation on the lower levels is performed in the case of the regulation of an individual zone via the remaining—usually cost intensive—energy sources. Here, zone denotes in general a room of a building or building complex, irrespective of whether it is completely enclosed as an individual room by ceiling, floor and walls, or whether what is involved is a number of rooms or room zones that are similar in terms of energy behavior. In this sense, a covered courtyard or an atrium, for example, is also denoted as a zone.

A building illustrated incompletely in FIG. 1 has a first zone 20, a second zone 21 and a third zone 22. The three zones have equipment for heating and cooling by which the room temperature $\theta_r$ in the zones can be varied, there being present as a rule in a zone equipments for controlling the energy flow from cost effective, that is to say so called free energy sources, for example, and equipments for controlling the energy flow from expensive energy sources, on the other hand.

Free energy sources are, for example, insulation, waste heat, outside air and generally passive heat and cold accumulators. Expensive energy sources are, for example, hot water heating systems driven by oil burners or electricity. As the price of an energy source generally depends on time, it is also possible to distinguish between free and expensive energy as a function of time, and so, for example, river or sea water can be a free energy source in many cases, but be expensive in dry times.

A predictive control device for optimum control of the use of at least one cost effective energy source is denoted by 24. The predictive control device 24 has a building model 25 and at least one microcomputer 26 for repeated optimization of the energy consumption required for heating or cooling the zones 20, 21 and 22. The predictive control device 24 can generate at least a first control signal 27 for optimum control of the use of a free energy source.

A system for regulating the room temperature $\theta_r$ advantageously has a hierarchical structure with an upper level 30 and at least one lower level 31 subordinate to the upper level 30. The upper level 30 is formed by the predictive control device 24. In principle, the upper level 30 can have a number of similar copies of the predictive control device 24.

In the example, the lower level 31 includes a first regulating unit 32 assigned to the first zone 20, a second regulating unit 33 assigned to the second zone 21, and a third regulating unit 34 assigned to the third zone. In principle, the subordinate level 31 includes at least one regulating unit, although in general a number of subordinate regulating units are present.

The regulating units 32, 33 and 34 of the subordinate level 31 are advantageously respectively fed as feedback signal 40, 41 or 42 a measured variable detected in the corresponding zone 20, 21 or 22.

In an advantageous design of the system, the first control signal 27 generated by the predictive control device 24 is fed as input variable to the regulating units 32, 33 and 34 of the lower level 31.

The regulated units 32, 33, 34 each generate at least a second control signal 43, 44 or 45, respectively, for controlling the use of a free energy source. If required, regulating units 32, 33 or 34 further generate a third control signal 46, 47 or 48, respectively, for controlling the use of an expensive energy source.

The second control signals 43, 44 and 45 and the third control signals 46, 47 and 48 advantageously include actuating information for controlling the units, arranged in assigned zone 20, 21 or 22 for controlling the energy flow from free and expensive energy sources, respectively. In order to control free energy sources, the exemplary system has solar protection devices 49 arranged in all zones 20, 21 and 22, a cooling tower 50 assigned to the first zone 20, and ventilation dampers 51 or 52 arranged in the first zone 20 and in the second zone 21. Heating water valves 53 and cooling water valves 54 are arranged in the second zone 21 and also in the third zone 22 in order to control expensive energy sources. Moreover, an energy recovery device 55 is assigned to the third zone 22.

One measured variable 56, 57 and 58 each that is respectively detected in the corresponding zone 20, 21 or 22 is advantageously fed back to the predictive control device 24.

The controlling units 32, 33 and 34 arranged at the lower level 31 are implemented, for example, by commercially available PID controllers designed for room air conditioning applications. In the present example, only the regulation on the uppermost level is considered in more detail, while the regulation on the lower levels is assumed to be ideal.

The basic building model 25 used for a controller on the uppermost level is typically a simple model that reflects the substantially static and dynamic thermal properties of the building. An example of such a building model is introduced below. The same building model is also used here as a basis in order to indicate the potential of predictive regulation for integrated room automation.

Building Model

A schematic of the exemplary building model is shown in FIG. 2. The building model essentially comprises a first model part 60 for modeling the building core, a second model part 61 for modeling the building shell, and a third model part 62 for modeling windows and the central room nodes 63 at room temperature $\theta_r$, the most important output variable of the building model. The input variables for the building model are divided into manipulated and disturbance variables. Here, the manipulated variables are the heating power $u_1$, the cooling power $u_2$, the solar protection position, $u_3$ and the normalized free cooling power $u_4$. In this context, free cooling power means that a substantially cost free energy source, that is to say cool outside air or cool seawater, for example, can be used for cooling. In the case of the solar protection position $u_3$, for example, the value zero signifies closed, and one signifies open. For the free cooling power $u_4$, the value zero signifies no free cooling, and the value one signifies maximum cooling. In the context of this example, it is assumed that the cost intensive cooling and heating sources are unlimited as regards the power output.

Limits for the manipulated variables are specified in inequalities G1 and G2.

$$0 \le u_1(t) 0 \le u_3(t) \le 1 \tag{G1}$$

$$0 \le u_2(t) 0 \le u_4(t) \le 1 \tag{G2}$$

Disturbance variables are the outside air temperature $\theta_{oa}$, the outside air wet bulb temperature of $\theta_{oawb}$, the solar energy gains given completely closed solar protection $\dot{q}_{s0}$ that is to say the secondary heat transfer, the additional solar energy gains for completely open solar protection $\dot{q}_{s1}$, that is to say the radiation, and the internal heat gains $\dot{q}_i$.

In the exemplary building model, the heat flux through the external walls and windows, and the heat flux into the inwardly situated parts of the building or out of the latter are modeled. The heating power $u_1$ and the internal heat gains $\dot{q}_i$ act directly on the common room thermal node, which is linked to the detectable room temperature $\theta_r$. The cooling power $u_2$ and the free cooling $u_4$ act on the thermal node at the ceiling or cooling ceiling, whereas the insulation $\dot{q}_{s1}$, acts both on the thermal nodes on the floor and on those on the ceiling. The secondary solar heat gains $\dot{q}_{s0}$ act on the inside of the external shell. The heat transfer coefficients for the window and for the free cooling system change in conjunction with the solar protection position $u_3$ and of the free cooling activities $u_4$, respectively. In order to represent the dynamic behavior of an actual building, the thermal capacities are assigned to a concentrated room thermal node $C_r$, an external shell $C_{o1}$, $C_{o2}$, $C_{o3}$ and internally situated parts $C_{i1}$, $C_{i2}$, $C_{i3}$ of the building. The windows have no thermal capacity in the model. The building model can be written as the representation of a pseudo linear state space in accordance with the equations G3, the state vector $\underline{x}$ being given by equation G4, the disturbance variable $\underline{v}$ vector G5 by equation G5, and the state space matrices by equations G6 to G9. Heat transfer coefficients in the building model are denoted by K, and an air change ratio is denoted by $\dot{n}_a$.

$$\dot{\underline{x}}(t) = A\underline{x}(t) + B_u\underline{u}(t) + B_v\underline{v}(t) + \underbrace{\sum_{i=1}^{4}[(B_{vu,i}\underline{v}(t) + B_{xu,i}\underline{x}(t))u_i(t)]}_{B_u^*(\underline{x}(t)\underline{v}(t))\underline{u}(t)} \quad (G3)$$

$$y(t) = C\underline{x}(t)$$

$$\underline{x}^T(t) = [\vartheta_r(t)\vartheta_{i1}(t)\vartheta_{i2}(t)\vartheta_{i3}(t)\vartheta_{o1}(t)\vartheta_{o2}(t)\vartheta_{o3}(t)] \quad (G4)$$

$$\underline{v}^T(t) = [\vartheta_{oa}(t)\vartheta_{oawb}(t)\dot{q}_{s0}(t)\dot{q}_{s1}(t)\dot{q}_i(t)] \quad (G5)$$

$$A = \begin{bmatrix} \frac{n_a C_a + K_{w0} + K_{i1} + K_{o1} + K_{i4}}{C_r} & \frac{K_{i1}}{C_r} & 0 & \frac{K_{i4}}{C_r} & \frac{K_{o1}}{C_r} & 0 & 0 \\ \frac{K_{i1}}{C_{i1}} & \frac{K_{i1} + K_{i2}}{C_{i1}} & \frac{K_{i2}}{C_{i1}} & 0 & 0 & 0 & 0 \\ 0 & \frac{K_{i2}}{C_{i2}} & \frac{K_{i2} + K_{i3}}{C_{i2}} & \frac{K_{i3}}{C_{i2}} & 0 & 0 & 0 \\ \frac{K_{i4}}{C_{i3}} & 0 & \frac{K_{i3}}{C_{i3}} & \frac{K_{i3} + K_{i4}}{C_{i3}} & 0 & 0 & 0 \\ \frac{K_{o1}}{C_{o1}} & 0 & 0 & 0 & \frac{K_{o1} + K_{o2}}{C_{o1}} & \frac{K_{o2}}{C_{o1}} & 0 \\ 0 & 0 & 0 & 0 & \frac{K_{o2}}{C_{o2}} & \frac{K_{o2} + K_{o3}}{C_{o2}} & \frac{K_{o3}}{C_{o2}} \\ 0 & 0 & 0 & 0 & 0 & \frac{K_{o3}}{C_{o3}} & \frac{K_{o3} + K_{o4}}{C_{o3}} \end{bmatrix} \quad (G6)$$

$$B_u = \begin{bmatrix} \frac{1}{C_r} & 0 & 0 & 0 \\ 0 & \frac{1}{C_{i1}} & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix} \quad B_v = \begin{bmatrix} \frac{n_a C_a + K_{w0}}{C_r} & 0 & 0 & 0 & \frac{1}{C_r} \\ 0 & 0 & 0 & 0 & 0 \\ 0 & 0 & 0 & 0 & 0 \\ 0 & 0 & 0 & 0 & 0 \\ 0 & 0 & \frac{1}{C_{o1}} & 0 & 0 \\ 0 & 0 & 0 & 0 & 0 \\ \frac{K_{o1}}{C_{o3}} & 0 & 0 & 0 & 0 \end{bmatrix} \quad B_{vu,1} = B_{vu,2} = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \quad (G7)$$

$$B_{vu,3} = \begin{bmatrix} \frac{\Delta K_w}{C_r} & 0 & 0 & 0 & 0 \\ 0 & 0 & 0 & \frac{a}{C_{i1}} & 0 \\ 0 & 0 & 0 & 0 & 0 \\ 0 & 0 & 0 & \frac{1-a}{C_{i3}} & 0 \\ 0 & 0 & 0 & 0 & 0 \\ 0 & 0 & 0 & 0 & 0 \\ 0 & 0 & 0 & 0 & 0 \end{bmatrix}$$

$$B_{vu,4} = \begin{bmatrix} 0 & 0 & 0 & 0 & 0 \\ 0 & \frac{K_{i2}}{C_{i1}} & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \quad B_{xu,1} =_{xu,2} = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \quad B_{xu,3} = \begin{bmatrix} \frac{\Delta K_w}{C_r} & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \quad (G8)$$

$$B_{xu,A} = \begin{bmatrix} 0 & 0 & 0 & 0 & 0 & 0 & 0 \\ 0 & \dfrac{K_j}{C_{i1}} & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{bmatrix}$$

The Regulation Optimization Problem

It is advantageous to use linear programming in order to determine the solution to the regulation optimization problem with the aid of minimizing a cost function J represented in equation G10.

$$J(u) = \sum_{i=0}^{n-1} ((t_{i+1} - t_i)\underline{w}^T(t_i)\underline{u}(t_i))  \quad (G10)$$

The manipulated variables are assigned weights $\underline{w}$ in each step, a weight constituting an evaluation in costs per unit; a value n is the number of optimization intervals. The corresponding intervals define the division of the optimization horizon, relatively large intervals toward the end of the horizon offering the possibility of reducing the extent of the optimization problem and thus the required computing time with only slight effects on the solution. Apart from the retention of the limitations on the manipulated variables $\underline{u}$ given in equations G1 and G2, there can also be optimization limitations for the state vector $\underline{x}$ or for the output vector $\underline{y}$. These limitations take account of the physics of the system G3, which is modeled by the equations G3, when calculating the optimization. Here, the optimization problem is formulated such that the room temperature $\theta_r$ remain in a comfort range represented by an equation G11.

$$\theta_{r,min} \leq \theta_r \leq \theta_{r,max} \quad (G11)$$

Since use is made of linear programming to solve the optimization problem, the future states for calculating the matrices $B_{ij}^*$ for the input manipulated variables are fixed— for example to the actual state vector—so that a linear optimization problem results. It is possible to apply an iterative procedure to find an optimum solution to the nonlinear problem, the solution to the state vector being used for the linear problem in order to calculate the matrices $B_{ij}^*$ for the next iteration.

The optimization problem is repeated and solved with the aid of a scanning time $t_c$ that is, as a rule, very much shorter than the length of the optimization horizon. For a sliding horizon, only the optimized manipulated variables are used for the next scanning time after each optimization.

In the present example, parameters determined in equations G6 to G9 on the basis of an office building typical of Switzerland. The measured data for insulation, outside air temperature and outside air wet bulb temperature are used for Zurich. The internal heat gains are fixed at 25 W/m² for working days in the time from 8.00 h to 20.00 h, otherwise 5 W/m² applies. A constant weight $\underline{w}$ in accordance with an equation G12 is applied for each optimization within the optimization horizon.

$$\underline{w}^T = [1\ 3\ -0.1\ 10] \quad (G12)$$

A heating power of 1 kW serves as basis for normalizing the weighting. Negative weighting is selected for the solar protection position, since a closed solar protection necessitates more intensive artificial lighting. Artificial lighting is treated in this way indirectly through costs for a closed solar protection. Maximum free cooling brings about costs that are equivalent to a heating power of 10 kW.

A comparison between ideal nonpredictive regulation and ideal predictive regulation is decisive for fully utilizing the energy saving potential, and thus the cost saving potential, of predictive regulation. Here, ideally use is made of a model based predictive controller with a model that corresponds to the regulated process model; the disturbances are exactly known for each optimization horizon. Thus, the main difference between nonpredictive and predictive regulation comes from the length of the optimization horizon. The following three regulation strategies are discussed:

A first strategy I, having ideal predictive regulation with a scanning time $t_s=0.5$ h and a length of $t_{opt}=72$ h for the optimization horizon.

A second strategy II, having short term optimal regulation, with a scanning time of $t_s=0.5$ h and a length of $t_{opt}=0.5$ h for the optimization horizon.

Furthermore, there is a third strategy III, which is a representative example of a known regulation algorithm. On the one hand, a solar protection is used here as cooler, and this can be achieved by a closed solar protection where insulation is present, and by open solar protection where insulation is absent, if the last active operation was a cooling process, that is to say $u_2>0$ or $u_4>0$. On the other hand, the solar protection is used as the heater; that is to say, open solar protection in the presence of insulation, and closed solar protection given a lack of insulation, free cooling being favored when $\theta_{oawb}>15°$ C. if the last active operation was a heating process $(u_1>0)$. This was approximated here by setting the weight for the solar protection position at 0.1 if the last active operation was a cooling process, and back to minus 0.1 if the last active operation was a heating process. Moreover, the weight for the free cooling is set to minus 10 if the outside air wet bulb temperature $\theta_{oawb}>15°$ C. and the room temperature $\theta_r>(\theta_{r,min}+\theta_{r,max})/2$, otherwise a setback to 10, $t_s=0.5$ h and $t_{opt}=0.5$ h.

The energy costs that have accumulated in whole year simulations for the three strategies are determined—in accordance with the weight in equation G12, but without having weighed the solar protection position: for the first strategy I, the result was average costs of $6.44 \cdot 10^{-3}/m^2$, the second strategy II gave rise to average costs of $13.6 \cdot 10^{-3}/m^2$, and average costs of $9.19 \cdot 10^{-3}/m^2$ resulted for the third strategy III.

A comparison between the predictive first strategy I and the nonpredictive third strategy III for 14 days in spring is shown in FIG. 3. The predictive strategy I is successful in keeping the room temperature in the comfort range merely with the aid of cost effective heating and cooling sources. Consequently, the room temperature $\theta_r$ is kept high when days to come become cooler and, as in days 131 to 135, there are smaller solar energy gains, and the room temperature is kept lower when the next days are warm and, as in days 136 and 137, high solar energy gains take effect. The thermal capacities of the building are in this way exhausted and recharged with cost effective energy.

The results set forth show that predictive integrated room automation and a substantial marketable potential. The predictive regulation solution is superior to the nonpredictive, particularly whenever cost effective heating and cost effective cooling can be used for cooling and heating a building at an early point in time, that is to say before cost intensive heating and cooling become necessary. When fast, that is to say cost intensive heaters and coolers are present, comfort is then not impaired by a predictive controller of the type envisaged—even when the building model of the controller is poor and the future disturbances are wrongly estimated.

The system also includes permanent or removable storage, such as magnetic and optical discs, RAM, ROM, etc. on which the process and data structures of the present invention can be stored and distributed. The processes can also be distributed via, for example, down-loading over a network such as the Internet. The system can output the results to a display device, printer, readily accessible memory or another computer on a network.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A system with a control arrangement having a hierarchical structure of at least two hierarchical levels for controlling and regulating room temperature in a building, comprising:
    at least one predictive controller, arranged at an upper hierarchical level of the control arrangement, providing optimum control of use of at least one free energy source or cost effective energy source; and
    at least one subordinate controller, arranged at a lower hierarchical level subordinate to the upper hierarchical level of the control arrangement, providing feedback regulation of at least one additional energy source in a zone controlled by the at least one subordinate controller to the at least one predictive controller, wherein
    said at least one predictive controller generates a control signal for said at least one subordinate controller for feedback regulation based on the feedback regulation provided by the subordinate controller, the control signal having information relating to the optimum use of the free energy source or cost effective energy source, and
    said at least one predictive controller uses a building model and has a regulation strategy that utilizes properties of a passive heat accumulator of the building.

2. The system as claimed in claim 1, wherein a comfort temperature band is used, delimited by a lower temperature and an upper temperature and in which the room temperature is regulated.

3. The system as claimed in claim 2, wherein the comfort temperature band spans at least two degrees Kelvin.

4. The system as claimed in claim 2, wherein the comfort temperature band spans at least four degrees Kelvin.

5. The system as claimed in claim 1, wherein said at least one predictive controller includes means for repeatedly optimizing at least one of energy consumption and energy cost.

6. The system as claimed in claim 5, wherein the optimizing is carried out by linear programming.

7. The system as claimed in claim 5, wherein the free energy source used by said at least one predictive controller includes at least one of sunlight, waste heat, outside air, sea water and ground.

8. The system as claimed in claim 1,
    further comprising at least one solar protection device, and
    wherein said at least one predictive controller calculates a control signal for said at least one solar protection device, and the control signal is transmitted to said at least one subordinate controller.

9. The system as claimed in claim 1,
    further comprising at least one energy recovery device, and
    wherein said at least one predictive controller calculates a control signal for said at least one energy recovery device, and the control signal is transmitted to said at least one subordinate controller.

10. The system as claimed in claim 1,
    further comprising at least one cooling tower, and
    wherein said at least one predictive controller calculates a control signal for said at least one cooling tower, and the control signal is transmitted to said at least one subordinate controller.

11. The system as claimed in claim 1,
    further comprising at least one air damper, and
    wherein said at least one predictive controller calculates a control signal for said at least one air damper, and the control signal is transmitted to said at least one subordinate controller.

12. The system as claimed in claim 1, wherein said at least one subordinate controller controls equipment controls at least one of free energy resources and equipment controlling cost intensive energy sources.

* * * * *

UNITED STATES PATENT AND TRADEMARK OFFICE
CERTIFICATE OF CORRECTION

| | | |
|---|---|---|
| PATENT NO. | : 8,818,563 B2 | Page 1 of 1 |
| APPLICATION NO. | : 12/083543 | |
| DATED | : August 26, 2014 | |
| INVENTOR(S) | : Markus Gwerder et al. | |

It is certified that error appears in the above-identified patent and that said Letters Patent is hereby corrected as shown below:

In the claims

Column 10, line 20, claim 7, delete "claim 5," and insert -- claim 1, --, therefor.

Signed and Sealed this
Eighteenth Day of November, 2014

Michelle K. Lee
*Deputy Director of the United States Patent and Trademark Office*